United States Patent [19]

Kiang

[11] 4,192,659

[45] Mar. 11, 1980

[54] METHOD FOR HOT GAS COOLING AND GASEOUS CONTAMINANT REMOVAL

[75] Inventor: Yen-Hsiung Kiang, Collegeville, Pa.

[73] Assignee: The Trane Company, La Crosse, Wis.

[21] Appl. No.: 931,580

[22] Filed: Aug. 7, 1978

[51] Int. Cl.² .............................................. B01D 47/14

[52] U.S. Cl. .............................................. 55/89; 55/71; 55/93; 55/229; 55/233; 55/267; 261/17; 261/126; 261/128; 261/DIG. 9

[58] Field of Search .................. 55/71, 80, 89, 90, 93, 55/229, 233, 267; 261/17, 126, 128, DIG. 9

[56] References Cited

U.S. PATENT DOCUMENTS

| | | | |
|---|---|---|---|
| 1,593,310 | 7/1926 | Robinson | 261/98 |
| 1,649,345 | 11/1927 | Gilmore | 261/113 |
| 3,191,916 | 6/1965 | Kurpit et al. | 261/148 |
| 3,404,512 | 10/1968 | Tomany | 55/89 |
| 3,456,709 | 7/1969 | Vegeby | 55/229 |
| 3,532,595 | 10/1970 | Arnesto et al. | 55/267 |
| 3,541,761 | 11/1970 | Pike | 55/90 |
| 3,733,777 | 5/1973 | Huntington | 261/DIG. 9 |
| 3,803,804 | 4/1974 | Arashi et al. | 55/89 |
| 3,815,334 | 6/1974 | Kotting et al. | 55/90 |
| 3,927,153 | 12/1975 | Tarhan | 55/89 |
| 3,959,419 | 5/1976 | Kitterman | 55/90 |
| 3,969,094 | 7/1976 | Dunson, Jr. et al. | 261/114 R |
| 4,045,190 | 8/1977 | Judat et al. | 261/114 R |

FOREIGN PATENT DOCUMENTS

| | | | |
|---|---|---|---|
| 863336 | 11/1952 | Fed. Rep. of Germany | 55/71 |

OTHER PUBLICATIONS

Yen-Hsiung Kiang, Controlling Vinyl Chloride Emission, Aug. 29–Sep. 1, 1976, presented to Aiche 82nd National Meeting.

Distillation, Matthew Van Winkle, McGraw-Hill, 1967, Chapter 12, pp. 479–494 and Chapter 15, pp. 604–616.

*Primary Examiner*—David L. Lacey

*Attorney, Agent, or Firm*—Carl M. Lewis; Peter D. Ferguson

[57] ABSTRACT

Method and apparatus are disclosed for cooling a process gas stream having a temperature in the range from about 400° F. and 3000° F. and absorbing gaseous contaminants therefrom wherein contact is effected between said process gas stream and respective quench and absorbent liquids in order to provide said cooling and absorbing functions. The flow rates of the process gas stream, quench liquid, and/or absorbent liquid are subject to substantial variations due to operating conditions related to the process gas source or to the provision for contaminant recovery, requiring absorbent liquid of a desired concentration. In practice, the process gas stream may be that discharged from a waste product incinerator containing not only products of combustion but also the aforesaid gaseous contaminants. In accordance with the invention, the process gas stream is passed initially through a first treatment column in contact with a quench liquid in order to cool the gas stream, which first treatment column is of the packed, differential type which exhibits an adequate cooling efficiency over the aforesaid substantial variations in flow rate of the process gas stream and/or quench liquid. The cooled process gas stream is then passed through a second treatment column in contact with an absorbent liquid to absorb a portion of the gaseous contaminants therefrom, which second treatment column is of the equilibrium-stage type exhibiting an adequate absorption efficiency over the variations in flow rate of the process gas stream and/or absorbent liquid. The use of a "hybrid" tower, containing columns of both the packed, differential and equilibrium-stage type permits operation over much wider variations in flow rate of the process gas stream, quench liquid, and/or absorbent liquid than prior art arrangements.

8 Claims, 2 Drawing Figures

METHOD FOR HOT GAS COOLING AND GASEOUS CONTAMINANT REMOVAL

BACKGROUND OF THE INVENTION

1. Field of the Invention

The present invention has application in those process industries wherein gas streams are encountered which contain gaseous contaminants and exhibit a temperature in the range from about 400° F. to 3000° F. A specific example of such a process gas stream would be that discharged from a waste product incinerator which contains both products of combustion and also gaseous contaminants as a result of incineration of the aforesaid waste product. As is well-known to those working in this general area, both local and federal government regulations regulate strictly those materials which may be discharged into the atmosphere and, accordingly, provision must be made to treat such process gas streams in order to bring their composition into compliance with applicable regulations. Moreover, in many instances, the process gas streams will contain valuable constituents which may be advantageously recovered for reuse or sale.

A particular problem which exists in treating process gas streams of the type under consideration is that, during operation of the waste product incinerator or other apparatus involved, the discharge therefrom of the process gas stream may be subject to substantial variations in flow rate. In order to accommodate this problem, it is desirable that the treatment method and apparatus be sufficiently flexible as to handle adequately the aforesaid substantial variations in process gas stream flow rate.

A second problem in treating process gas streams of the type under consideration is presented if recovery of the particular contaminants involved is desired. In this event, it is necessary that the absorbent liquid reach at least a minimum level of concentration in order to facilitate such recovery. Obviously, this requirement may dictate the desired, proper flow rate of absorbent liquid through the treatment apparatus; however, such flow rate must also be adequate to provide adequate absorption efficiency in the apparatus and, in some installations, may also have an effect upon the proper cooling of the process gas stream, as will appear hereinafter.

2. Description of the Prior Art

At the present time, an acidproof brick lined packed tower, similar to the first treatment column of this invention, has been used almost exclusively for process gas cooling and contaminant removal. The drawback of this method is that the unit can be operable only over a range of 50% to 100% of the designed process gas flow rate without losing scrubbing efficiency. A second drawback of this method is that the packings require a minimum wetting rate. If the fresh make-up liquid rate is lower than the minimum wetting rate of packing, it has to be satisfied either by increasing the fresh liquid rate, which will decrease the concentration of the liquid recovered; or by recirculating the quench/absorbent liquid, which will reduce the efficiency of the absorption column. Systems embodying two packed bed towers, either in parallel or in series, have also been used to solve the problems described by selectively deactivating one of the towers at low flow rates. Also, packings of variable sizes in one tower have been used but this approach risks the flooding of the tower.

To increase the operable range of the process gas flow rate variations, fresh air has been used to boost up the mass flow rate of the process gas. However, the required air flow rates are usually three to four times higher than the maximum exhaust gas flow rates. Thus, high operating and capital costs limit the use of this method.

SUMMARY OF THE INVENTIONS, OBJECTS

In the prior art related to treatment of process gas streams, which may include both the cooling thereof and removal of gaseous contaminants therefrom, the use of treatment columns wherein the process gas stream is brought into direct contact with a quench/absorbent liquid is common. Treatment columns providing such gas/liquid contact may be divided into at least two general types, the "packed, differential" type and the "equilibrium-stage" type.

Treatment columns of the packed, differential type include both dump or random-packed columns, wherein discrete pieces of packing are randomly arranged within the treatment column, and geometrically-packed columns wherein a more uniform packed matrix is provided within the column constructed of specially manufactured sections of packing. A third type of packed column is referred to in the art as a "pseudo-plate" column wherein the contacting surface is provided by a series of grids which are stacked within the treatment column.

As mentioned above, packed, differential type treatment columns have been utilized in the past for treating process gas streams of the type under consideration; however, such columns suffered a drawback in that if the flow rate of the process gas stream dropped below 50% of the nominal design flowrate, its capacity to absorb gaseous contaminants dropped to an unacceptable level. Another drawback of the packed, differential type treatment column is that it requires a minimum liquid wetting rate. If the particular process requires a liquid flow rate below this minimum level, recirculation is required which reduces the absorption efficiency of the apparatus.

Treatment columns of the equilibrium-stage type are exemplified by the familiar bubble cap plate-type but may also include variations thereof such as perforated plates or proprietary designs such as "Uniflux" or "Koch". Treatment columns of this type are characterized by the provision of downcomers in order to accommodate liquid flow between adjacent stages or plates within the column. While columns of this type provide adequate absorption efficiency over substantial variations in flow rates of the process gas stream and/or absorbent liquid, they are generally unsuitable for treating high temperature gas streams due to the materials of which they are constructed.

Reference may be had to a textbook entitled, DISTILLATION, written by Matthew Van Winkle and published by McGraw-Hill in 1967 for a discussion of these two types of treatment columns. Chapter 12 thereof is pertinent to columns of the equilibrium-stage type; and chapter 15 is pertinent to columns of the packed, differential type.

The present invention comprises method and apparatus for cooling and absorbing gaseous contaminants from a process gas stream which utilizes a "hybrid" treatment tower which includes treatment columns of both the packed, differential type and the equilibrium-stage type so as to take advantage of the superior operating characteristics of both over substantial variations in the flow rates of the process gas stream, quench liquid, and/or absorbent liquid.

More particularly, the method of the present invention comprises cooling a process gas stream having a temperature in the range from about 400° F. to 3000° F. and absorbing gaseous contaminants therefrom wherein contact is effected between said process gas stream and respective quench and absorbent liquids in order to provide said cooling and absorbing functions. The flow rates of the process gas stream, quench liquid, and/or absorbent liquid are subject to substantial variations due to operating conditions related to the process gas source or to the provision for contaminant recovery, requiring absorbent liquid of a desired concentration. The method comprises the steps of initially passing the process gas stream through a first treatment column in contact with a quench liquid in order to cool the process gas stream, said first treatment column being of the packed, differential type exhibiting adequate cooling efficiency over the aforesaid substantial variations in flow rates of the process gas stream and/or quench liquid. The thus-cooled process gas stream is then passed through a second treatment column in contact with an absorbent liquid to absorb a portion of the gaseous contaminants therefrom, which second treatment column is of the equilibrium-stage type exhibiting an adequate absorption efficiency over the aforesaid variations in flow rates of the process gas stream and/or absorbent liquid.

The apparatus of the present invention includes first treatment column means of the packed, differential type and the second treatment column means of the equilibrium-stage type suitable for carrying out the method described immediately above. Preferably, the apparatus comprises a single, vertically oriented tower structure which contains both said first and second treatment columns, which tower structure includes process gas stream inlet means at a lower portion thereof and process gas stream outlet means at an upper portion thereof.

In order to permit recovery of the aforesaid gaseous contaminants which are absorbed by the treatment process and apparatus, suitable conduit means are provided for withdrawing either or both of the quench and absorbent liquids at particular points for recovery purposes.

Accordingly, it is a primary object of the present invention to provide method and apparatus for cooling a process gas stream having a temperature in the range from about 400° F. to 3000° F. and absorbing gaseous contaminants therefrom wherein contact is effected between said process gas stream and respective quench and absorbent liquids in order to provide said cooling and absorbing functions, the flow rates of said process gas stream, quench liquid, and/or absorbent liquid being subject to substantial variations, utilizing a "hybrid" tower which includes treatment columns of both the packed, differential type and the equilibrium-stage type.

It is a further object of the present invention to provide a single tower which can achieve both cooling and gaseous contaminant absorption functions for the process gas stream when its flow rate is subject to substantial variations, including those between 20% and 100% of a design flow rate.

Another object of the invention is to provide method and apparatus for treating a process gas stream as outlined above wherein means are provided for recovery of the contaminants therefrom, which may require substantial variations in the flow rate of the absorbent liquid.

These and other objects of the present invention will become apparent from the description of preferred embodiments which follows, described with reference to the appended drawings.

DESCRIPTION OF PREFERRED EMBODIMENTS

Figure 1:
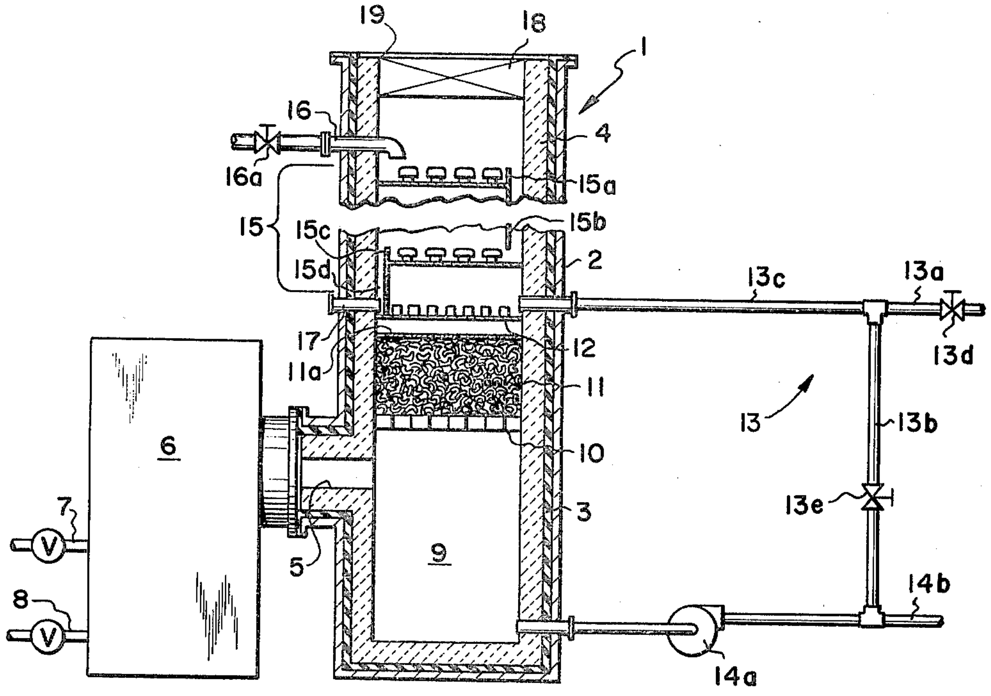
FIG. 1 is a schematic diagram in cross section of a first embodiment of the present invention.

Turning to FIG. 1 of the drawings, a single, vertically oriented tower structure is illustrated and indicated generally by reference numeral 1. The tower structure includes an outer casing 2 which may be generally cylindrical in cross section and constructed of metal as shown or, in the alternative, of a suitable fiber-reinforced plastic material. If a metal shell is utilized, it is important that a suitable lining 3 be provided which is constructed of a corrosion resistant material such as rubber. The interior surface of the tower structure is protected from high temperatures by a lining of refractory material such as acid brick, as shown at 4. Tower structure 1 includes at a lower portion thereof process gas stream inlet means 5 which is connected to a suitable source of a process gas stream to be treated.

Figure 2:
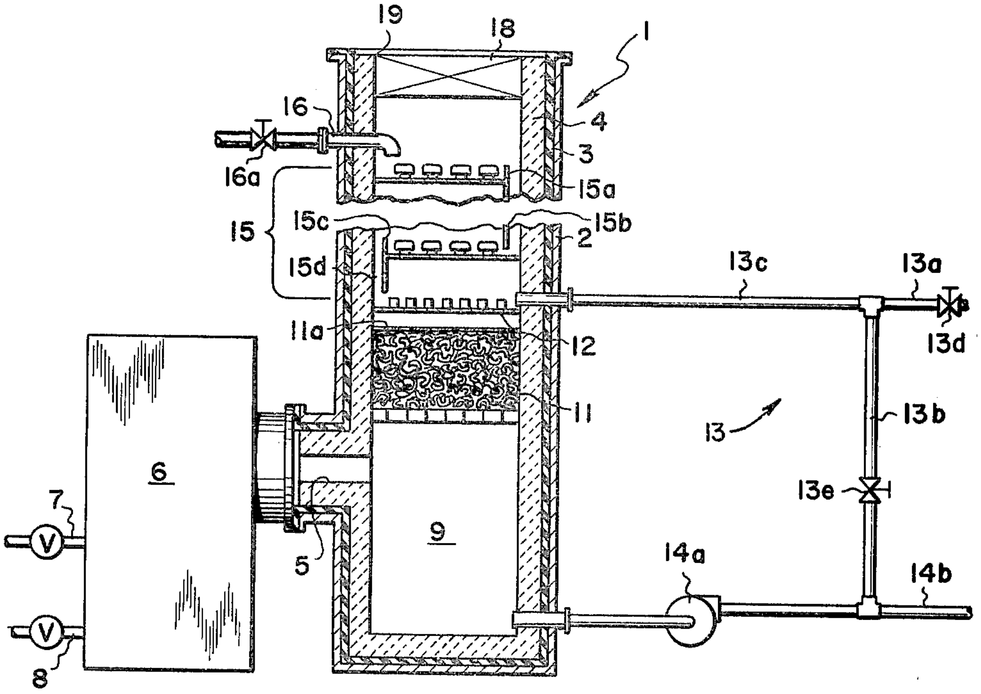
FIG. 2 is a schematic diagram in cross section illustrating a second embodiment of the present invention.

The embodiments illustrated in FIGS. 1 and 2 include for the sake of clarity a diagrammatic illustration such as a waste product incinerator 6 having a waste product inlet conduit 7 and a fuel inlet conduit 8. Incinerators of this general type are well known in the art and no detailed explanation thereof is believed necessary since the specific source of the process gas stream to be treated by the subject invention is not critical. It should be noted, however, that operation of waste product incinerator 6 involves the combustion of a fuel air mixture therein such that the waste product admitted via conduit 7 is incinerated thereby, resulting in a high temperature process gas stream which includes gaseous contaminants resulting from the waste product material involved. It should further be pointed out that, although a waste product incinerator is illustrated as the source for the process gas stream, the treatment method and apparatus of the present invention would also have application in treating flue gases from other sources such as furnaces and boilers where, depending upon the fuel being burned, gaseous contaminants may present a problem.

The process gas stream passes through inlet means 5 into a lower or sump portion 9 of the treatment tower, from which it passes upwardly through a conventional packing support/gas distributor 10 and into first treatment column means 11.

First treatment column means 11 are of the packed, differential type as discussed above, and as shown, comprise a plurality of randomly packed "saddles" constructed of suitable ceramic or porcelain material and which are maintained in position between packing support/gas distributor 10 and an upper packing retainer **11*a*. Disposed immediately above first treatment column means 11 is a liquid distributor 12 which receives a quench liquid, such as water, via third conduit means 13 which include a make-up liquid conduit 13*a*, a recirculated liquid conduit 13*b*, an inlet conduit 13*c*, and control valve means 13***d*, 13*e* for varying the relative proportions of fresh make-up quench liquid and recirculated liquid. As should now be apparent, the quench liquid is distributed over the packing of first treatment column means 11 and flows downwardly thereover in countercurrent relationship to the upwardly flowing gas stream, thereby effectively cooling said gas stream. It should also be noted that, in addition to the cooling function provided by first treatment column means 11, at least a portion of the gaseous contaminants contained in the gas stream will be absorbed by the quench liquid.

Although the packing material illustrated in FIGS. 1 and 2 for the first treatment column means comprise randomly packed "saddles", any of the commercially available packing materials for treatment columns of the packed, differential type are suitable for use in the first treatment column means of the present invention. Reference may be had to the aforementioned textbook entitled DISTILLATION, chapter 15, for a complete discussion and review of such packing materials. Moreover, although only a single packed column section is illustrated in the embodiment of FIG. 1, it is within the scope of the invention that a plurality of such sections be utilized in order to provide the desired capacity.

The process gas stream leaving first treatment column means 11 passes upwardly through quench liquid distributor 12 and into second treatment column means 15 which is of the equilibrium-stage type as exemplified by the plurality of bubble-cap plates, or trays illustrated in FIGS. 1 and 2. Since any number of bubble-cap plates may be stacked in order to provide a treatment column of the desired capacity, second treatment column means 15 are shown broken-away to indicate that more than two such plates may be provided.

An absorbent liquid is admitted to second treatment column means 15 at its upper portion via first conduit means 16 for distribution over the upper bubble-cap plate thereof, which absorbent liquid then overflows a weir member 15*a* and passes through downcomer space 15*b* to the next lower bubble-cap plate. Suitable control valve means 16*a* are associated with first conduit means 16 so as to vary the amount of absorbent liquid to be admitted to the second treatment column means 15. Thus, the resulting concentration of the absorbent liquid leaving second treatment column means 15 may be controlled in order to provide a desired concentration for contaminant recovery.

As discussed in the referenced textbook entitled DISTILLATION, chapter 12, the provision of downcomers between adjacent stages of the second treatment column means is one of the indicia of a equilibrium-stage type treatment column. Although the bubble-cap plate is used for illustration, any of the commercially available trays of the equilibrium type are suitable for use in the second treatment column means of the present invention.

The absorbent liquid passes over weir member 15*c* of the lowermost bubble-cap plate of the second treatment column means and flows into a sump 15*d*, from which it is withdrawn via conduit means 17 by which it may be transported to suitable recovery apparatus wherein the gaseous contaminants absorbed from the process gas stream may be recovered.

The process gas stream, after it has been cooled in first treatment column means 11 and had the contaminants removed therefrom by second treatment column means 15, continues to pass upwardly in tower 1 and passes through conventional droplet eliminator structure 18 and exits the tower via process gas stream outlet means 19.

It will be appreciated that, although the primary function of second treatment column means 15 is the absorption of gaseous contaminants from the process gas stream, this column means will also serve to further cool the process gas stream to at least a certain degree.

It will be further noted from FIG. 1 that the quench liquid is withdrawn from sump portion 9 of tower structure 1 by pump 14*a*, a portion of said quench liquid being selectively recirculated via third conduit means 13*b* and control valve means 13*e* through the first treatment column means, and the remainder of the quench liquid being carried by conduit means 14*b* either to a disposal area or to suitable apparatus for recovering the contaminants absorbed from the process gas stream. The provision of recirculation of the quench liquid not only enables a more concentrated liquid to be obtained, but also permits the maintenance of a minimum quench liquid flow rate through first treatment column means 11 necessary for proper wetting of the packed beds.

Turning now to FIG. 2 of the drawings it will be noted that the tower structure illustrated therein is similar in most respects to that of FIG. 1. Accordingly, this discussion will emphasize only the distinctions between FIG. 2 and FIG. 1, wherein common reference numerals have been utilized to identify common elements.

The most significant distinction between FIG. 2 and FIG. 1 lies in the fact that, in FIG. 2, the absorbent liquid admitted to second treatment column means 15 is also utilized as the quench liquid for first treatment column means 11. Thus, concentrated absorbent liquid from downcomer 15*d* is admitted directly to liquid distribution plate 12 where it joins recirculated and/or make-up liquid from inlet conduit 13*c* for passage over the packing of first treatment column means 11. The resulting concentrated liquid is withdrawn from sump 9 by pump means 14*a* to be conveyed by conduit means 14*b* to suitable recovery apparatus. As in the embodiment of FIG. 1, a portion of the concentrated liquid may be recirculated through first treatment column means 11 by way of conduit 13*b*, *c*; fresh make-up liquid, if required, being supplied by conduit 13*a*.

It should now be apparent that the method and apparatus of the present invention embody the use of a "hybrid" tower which includes treatment column means of both the differential, packed type and the equilibrium-stage type in such a manner as to take advantage of favorable operating characteristics of both. Thus, upon a decrease in the flow rate of the process gas stream, which would result in a decrease in the absorption efficiency of a differential, packed type treatment column, the second treatment column means of the present invention which is of the equilibrium-stage type will maintain an adequate level of gaseous contaminant absorption at the reduced flow rate. Similarly, the first treatment column means of the present invention retains its ability to adequately cool the process gas stream at low flow rates as well as at high flow rates, thereby protecting the second treatment column means from potentially damaging high temperatures.

When recovery of the particular contaminant from the absorbent liquid is required, it may be necessary to decrease the flow rate of fresh make-up absorbent liquid in order to provide a concentration of a level desired for such recovery. In certain cases, this requirement may result in a liquid flow rate below the minimum required by the differential, packed first treatment column for proper wetting. Under these conditions, the second treatment column means will maintain an adequate level of contaminant absorption while the provision of recirculation of quench liquid in the first treatment column means will result in an adequately cooled process gas stream, thereby protecting the second treatment column means from potentially damaging high temperatures. Moreover, the recirculation will further increase the concentration of the quench liquid for contaminant recovery.

It has been found that a treatment column constructed in accordance with the present invention provides adequate cooling and contaminant absorption over substantial variations in the flow rate of the process gas stream, which variations may range from 20% to 100% of the design flow rate for the treatment tower. This repesents a significant improvement over the prior art designs known to applicant and described above which were capable of operating properly under variations in flow rate only between 50% and 100% of a design flow rate.

It has been further determined that the method and apparatus of the present invention provides adequate cooling and contaminant absorption from the process gas stream over substantial variations in the flow rate of fresh make-up liquid. This represents a significant improvement over the prior art designs which sacrificed either scrubbing efficiency or reduced liquid concentration.

The following example is included to illustrate the application of applicant's invention to a specific system wherein a waste process gas stream of a predetermined composition must be treated:

EXAMPLE

A waste process gas stream of the following composition, as may be produced by a VCM plant, is to be incinerated; waste heat and hydrochloric acid are to be recovered.

| | Wt. % |
|---|---|
| Ethylene | 5.15 |
| Ethylene Dichloride | 3.31 |
| Vinyl Chloride | .75 |
| Carbon Monoxide | 2.27 |
| Nitrogen | 67.44 |
| Oxygen | 5.18 |
| Carbon Dioxide | 15.89 |

Natural gas is used as auxiliary fuel. Ethylene dichloride and vinyl chloride will undergo the following combustion reaction:

$$C_2H_4Cl_2+5O/2_2\rightarrow 2\ CO_2+H_2O+2\ HCl$$

$$C_2H_3Cl+5O/2_2\rightarrow 2\ CO_2+H_2O+HCl$$

The combustion products of the above waste gases together with fuel, air and cooling water have a temperature of 2200° F. in the incinerator and 600° F. after boiler. The composition is:

| | Wt. % |
|---|---|
| $O_2$ | 5.72 |
| $N_2$ | 71.57 |
| $CO_2$ | 14.45 |
| $H_2O$ | 7.50 |
| HCl | .76 |

The existence of HCl (hydrochloric acid) requires gas treatment before the exhaust gas can be safely discharged. The process requirement of the system warrants a 30% to 110% operable range and requires only 20 GPM fresh make-up water to generate 10% HCl solution.

Applying applicant's present invention to this system, a single hybrid tower would be designed as follows: The inside diameter of this tower is 7'-3". The first treatment column is of 7'-3" height and consists of 2" size ceramic Super Intalox packing. The second treatment column consists of six (6) bubble-cap trays.

While the invention has been described with respect to preferred embodiments, it is to be understood that modifications thereto will be apparent to those skilled in the art within the scope of the invention, as defined in the claims which follow.

I claim:

1. A method of cooling a process gas stream comprising products of combustion which contain gaseous contaminants and having a temperature in the range from about 400° F. to 3000° F., and absorbing gaseous contaminants therefrom wherein contact is effected between said process gas stream and respective quench and absorbent liquids in order to provide said cooling and absorbing functions, the flow rates of said process gas stream, quench liquid, and/or absorbent liquid being subject to substantial variations; said method comprising the steps of a. passing said gas stream through a first treatment column in contact with a quench liquid in order to at least cool said process gas stream, said first treatment column being of the packed, differential type exhibiting an adequate cooling efficiency over said substantial variations in flow rates of said process gas stream and/or quench liquid; and b. passing the cooled process gas stream from said first treatment column through a second treatment column in contact with an absorbent liquid to at least absorb a portion of said gaseous contaminants from said process gas stream and thereby produce a concentrated absorbent liquid, said second treatment column being of the equilibrium-stage type exhibiting an adequate absorption efficiency over said substantial variations in flow rates of said process gas stream and/or absorbent liquid;

whereby the flow rates of said process gas stream, quench liquid, and/or absorbent liquid may undergo said substantial variations without substantial effect upon the adequate cooling of or contaminant removal from said process gas stream.

2. The method of claim 1 wherein said step (a) further includes absorbing a portion of said gaseous contaminants from said process gas stream in said quench liquid.

3. The method of claim 1 wherein said step (b) further includes cooling said process gas stream by contact with said absorbent liquid.

4. The method of claim 1 further including the step of withdrawing said concentrated absorbent liquid from said second treatment column after it has absorbed said portion of said gaseous contaminants, thereby permitting recovery of said contaminants.

5. The method of claim 1 further including the steps of a. admitting fresh absorbent liquid to said second treatment column at a flow rate to provide absorbent liquid of a desired concentration to permit recovery of said contaminants; and b. admitting the aforesaid concentrated liquid from said second treatment column to said first treatment column for use as said quench liquid and withdrawing the resulting concentrated liquid therefrom, thereby permitting recovery of said contaminants.

6. The method of claim 5 further comprising the step of recirculating a portion of the concentrated liquid withdrawn from said first treatment column through said first treatment column, whereby the flow rate of fresh absorbent liquid through said second treatment column may be reduced to a level at which inadequate operation of said first treatment column would otherwise result.

7. The method of claim 1 wherein said substantial variations in flow rate of said process gas stream cover a range of at least from about 20% to 100% of a design flow rate.

8. The method of claims 1, 2, 3, 4, 5, 6, or 7 wherein said first and second treatment columns are disposed within a single, vertically oriented tower structure with said second treatment column being located above said first treatment column, said tower structure including a process gas stream inlet at a lower portion thereof disposed below said first treatment column and a process gas stream outlet at an upper portion thereof disposed above said second treatment column.

* * * * *